(12) United States Patent
Braun (10) Patent No.: US 7,520,566 B2
(45) Date of Patent: Apr. 21, 2009

(54) STOWABLE VEHICLE SEAT APPARATUS AND METHOD

(75) Inventor: Drew P. Braun, Plymouth, IN (US)

(73) Assignee: Braun Seating Incorporated, Leiters Ford, IL (US)

(*) Notice: Subject to any disclaimer, the term of this patent is extended or adjusted under 35 U.S.C. 154(b) by 360 days.

(21) Appl. No.: 11/139,011

(22) Filed: May 25, 2005

(65) Prior Publication Data

US 2005/0269842 A1 Dec. 8, 2005

Related U.S. Application Data

(60) Provisional application No. 60/574,687, filed on May 26, 2004.

(51) Int. Cl.
*B60N 2/30* (2006.01)
(52) U.S. Cl. .................. 297/335; 297/232; 297/452.39; 296/65.09
(58) Field of Classification Search .................. 297/14, 297/158.2, 232, 331, 334, 335, 452.39; 296/65.05, 296/65.08, 65.09, 65.18
See application file for complete search history.

(56) References Cited

U.S. PATENT DOCUMENTS

| | | | | |
|---|---|---|---|---|
| 2,565,666 | A * | 8/1951 | Schaefer | 297/326 |
| 4,289,351 | A | 9/1981 | Wahls | |
| 4,720,143 | A * | 1/1988 | Schwartz et al. | 297/326 |
| 5,165,753 | A * | 11/1992 | Henderson | 297/326 |
| 5,435,625 | A * | 7/1995 | Weber | 297/362.13 |
| 5,489,141 | A * | 2/1996 | Strausbaugh et al. | 297/335 |
| 5,492,389 | A | 2/1996 | McClintock et al. | |
| 5,899,530 | A * | 5/1999 | Tedesco | 297/328 |
| 5,918,937 | A | 7/1999 | Moffa et al. | |
| 6,106,066 | A | 8/2000 | Moffa et al. | |
| 6,382,491 | B1 * | 5/2002 | Hauser et al. | 296/65.05 |
| 6,485,102 | B1 | 11/2002 | Moffa et al. | |
| 6,540,294 | B2 | 4/2003 | Moffa et al. | |
| 6,554,357 | B2 | 4/2003 | Moffa | |
| 6,669,261 | B2 * | 12/2003 | Roberts et al. | 296/65.09 |

* cited by examiner

*Primary Examiner*—Peter R. Brown
(74) *Attorney, Agent, or Firm*—Michael Best & Friedrich LLP (57) ABSTRACT

Some embodiments of the present invention provide a vehicle seat that is movable to different positions with respect to a vehicle and that is coupled to a lockable strut that is variable in length. In some embodiments, a user-manipulatable control is coupled to a lock associated with the strut, and can be manipulated to unlock the lock, and to thereby enable the vehicle seat to be moved. Also, in some embodiments the vehicle seat has a seat back movable to different positions with respect to a seat base and that can be selectively secured against movement with respect to the seat base.

12 Claims, 6 Drawing Sheets

STOWABLE VEHICLE SEAT APPARATUS AND METHOD

CROSS-REFERENCE TO RELATED APPLICATIONS

Priority is hereby claimed to U.S. patent application Ser. No. 60/574,687, filed on May 26, 2004, the entire contents of which are incorporated herein by reference.

BACKGROUND OF THE INVENTION

Stowable vehicle seats can be used to provide increased storage space within a vehicle, such as to provide room for a wheelchair or other items. Some types of stowable seats include a cantilevered seat base coupled to a seat back. In some cases, the seat back can be moved between folded and upright positions, enabling a user to sit on the seat when the seat back is in its upright position and to stow the seat while the seat back is in its folded position. Also, some types of vehicle seats are stowed by moving the seat from a horizontally deployed position to a substantially vertical stowed position. Stowable seats are often latched in the stowed position to prevent unintentional movement of the seat to an unstowed position.

SUMMARY OF THE INVENTION

Some embodiments of the present invention are directed toward a stowable vehicular seat having a telescoping strut that can lock the seat in stowed and/or deployed positions. In some embodiments, the telescoping strut can also control movement of the seat. Also, in some embodiments the telescoping strut can assist in moving the seat between stowed and deployed positions. The telescoping strut can comprise a variable length strut and a lock. The variable length strut can comprise a gas charged cylinder, a gas spring, a rod or other elongated member slideable inside of a tube, and the like. The variable length strut can be locked in at least one position to prevent movement of the seat in at least one direction.

The stowable vehicular seat according to some embodiments of the present invention can have a seat back that is moveable with respect to a seat base. Movement of the seat back can be controlled by a lever or other user-manipulatable control. In some embodiments, the lever or other user-manipulatable control can also be used to control movement of the seat between stowed and deployed positions.

Further aspects of the present invention, together with the organization and operation thereof, will become apparent from the following detailed description of the present invention when taken in conjunction with the accompanying drawings.

BRIEF DESCRIPTION OF THE DRAWINGS

The present invention is further described with reference to the accompanying drawings, which show various embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

DETAILED DESCRIPTION

Before embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising," or "having" and variations thereof herein is meant to encompass the items listed thereafter and equivalents thereof as well as additional items. Also, the terms "mounted," "connected" and "coupled" are used broadly, and encompass both direct and indirect mounting, connecting, and coupling. Further, "connected" and "coupled" are not restricted to physical or mechanical connections or couplings, and can include electrical connections or couplings, whether direct or indirect.

Referring FIGS. 1-6, a stowable seat according to an embodiment of the present invention is indicated generally at 10. The stowable seat 10 comprises a mount 12, a seat base 14, and a seat back 16.

Figure 5:
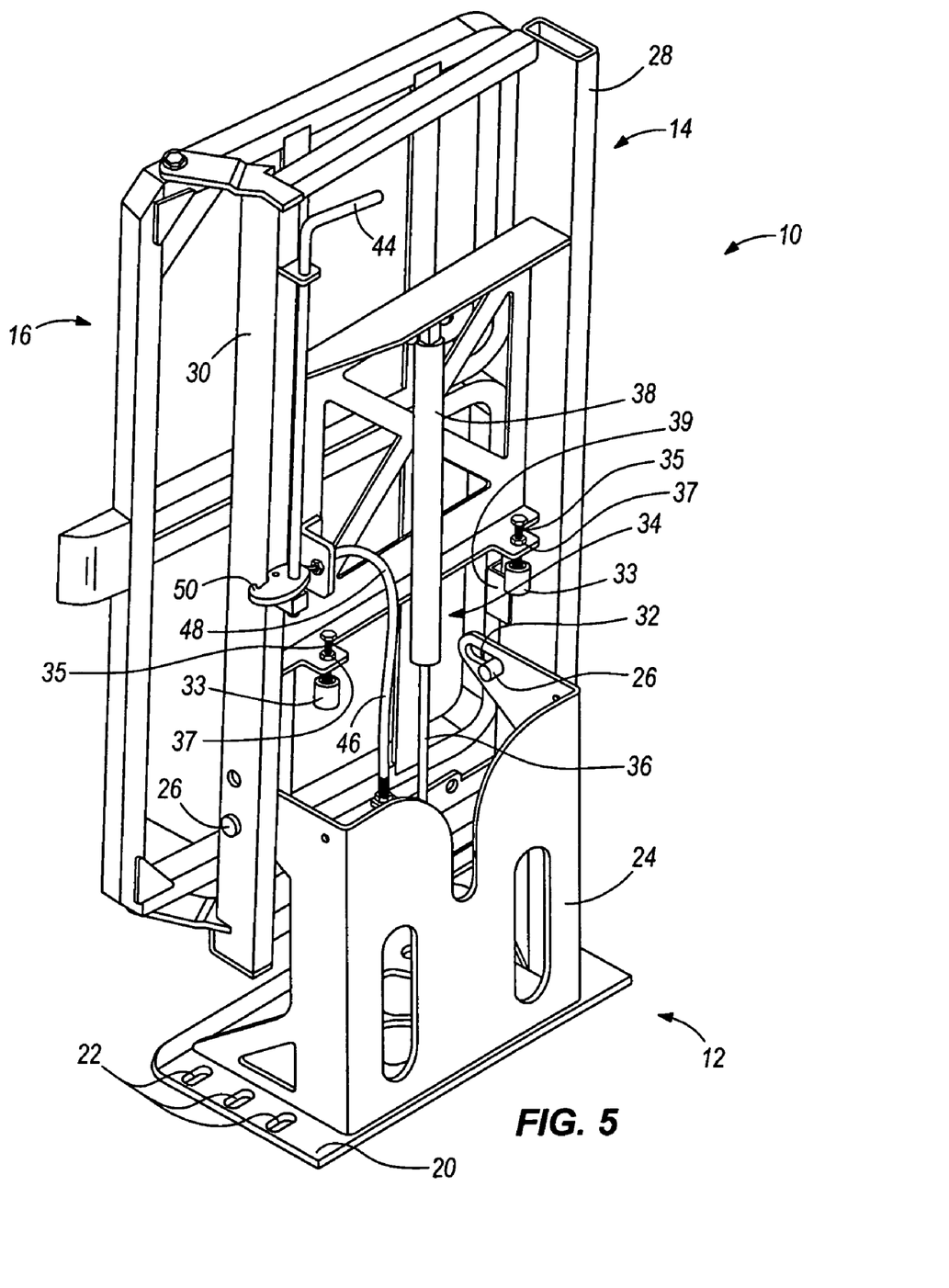
FIG. 5 is a rear perspective view of the stowable vehicular seat illustrated in FIGS. 1-4, shown with the seat base in a stowed position and the seat back in a folded position.
Figure 6:
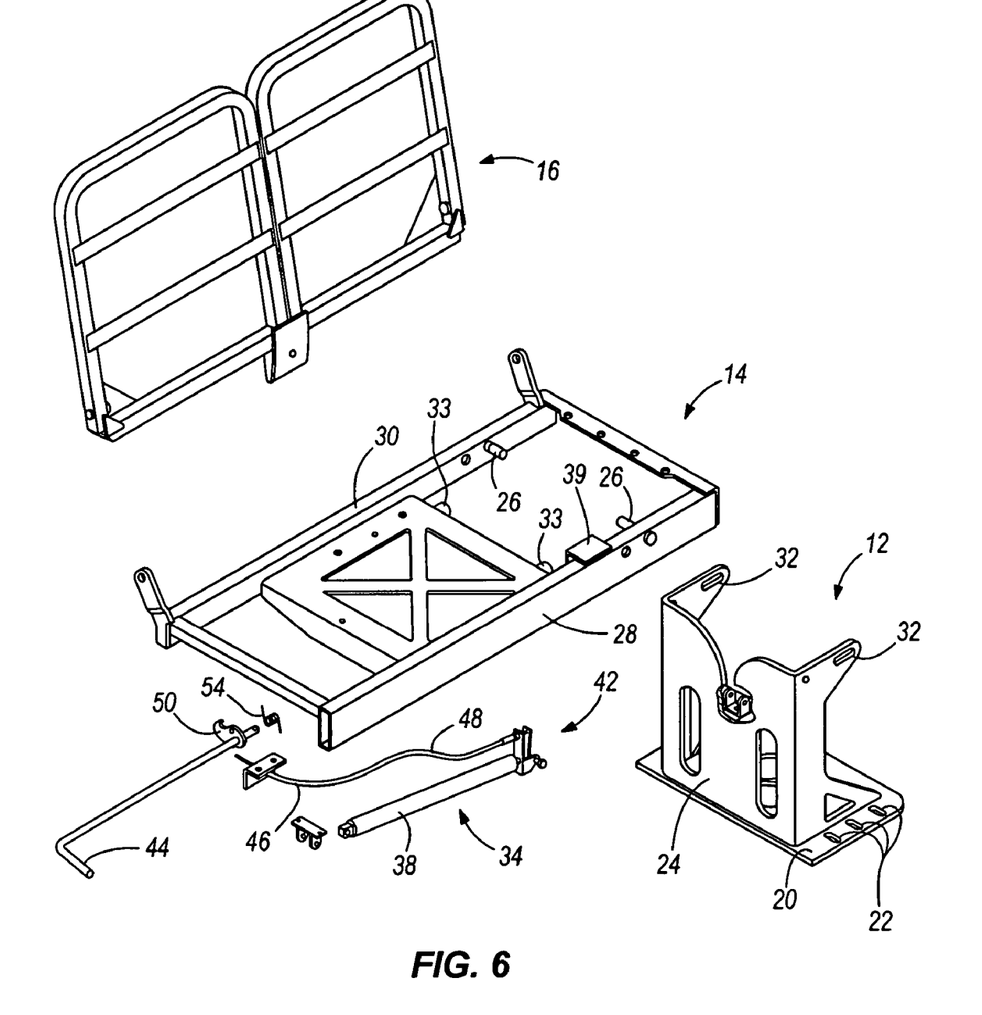
FIG. 6 is an exploded front perspective view of the stowable vehicular seat illustrated in FIGS. 1-5.

The stowable seat 10 illustrated in the figures has a deployed position in which the seat base 14 is substantially horizontal (see FIGS. 1-3 and 6), and a stowed position in which the seat base 14 is substantially vertical (see FIG. 5). In other embodiments, other orientations are possible for the deployed and/or stowed positions.

In some embodiments, the seat back 16 of the stowable seat 10 is movable between folded and unfolded positions with respect to the seat base 14. In some embodiments, this movement is enabled by pivotably mounting the seat back 16 to the seat base by one or more hinges, pivots, joints, or other pivotable connections.

In the folded position, the seat back 16 can lie against the seat base 14 (e.g., lie substantially flat against the seat base 14 or in another orientation against the seat base 14) and/or can be in a position generally facing the seat base 14. When the seat base 14 is in the deployed position and the seat back 16 is in the unfolded position, the seat back 16 can be oriented generally vertically or at a slight recline with respect to the seat base 14. In other embodiments, other folded and unfolded orientations of the seat back 16 with respect to the seat base 14 are possible and fall within the spirit and scope of the present invention.

The seat base 14 can be moved (e.g., raised in the illustrated embodiment) to a substantially vertical stowed position as shown in FIG. 5, and can be moved (e.g., lowered in the illustrated embodiment) to a substantially horizontal deployed position as shown in FIGS. 1-3 and 6. The stowable seat 10 can be maintained in either or both positions by a telescoping lock (described in greater detail below).

The stowable seat 10 can be mounted to a floor and/or a wall of a vehicle in any manner. In the illustrated embodiment, the stowable seat is mounted to a floor 18 (see FIG. 2) of a vehicle via the mount 12. The mount 12 can include a foot 20 by which the mount 12 can be secured to the vehicle. The mount 12 can take any shape, such as a plate 20 as shown in the illustrated embodiment. The plate 20 illustrated in the figures is provided with apertures such as bolt holes 22 for bolting or otherwise securing the plate 20 to the floor, wall, or other support feature in the vehicle. It will be appreciated that the plate 20 (or other portion of the mount 12) can be secured to the floor and/or wall of a vehicle in any other manner, such as by nails, screws, pins, rivets, and other conventional fasteners, one or more clamps or inter-engaging elements, by welding or brazing, by adhesive or cohesive bonding material, and the like. The mount 12 can also include a body, frame, or other structure extending from the foot 20 to the seat base 14. For example, one or more supports 24 can extend from the foot 20 of the mount 12, and can be one or more tubes having a square, round, or other cross-sectional shape, one or more channels or plates having any shape, and the like. The mount 12 and/or the foot 20 can be constructed of steel, iron, or other metal, plastic or other synthetic material, composites, or any other suitable material.

The mount 12 can be located at any position with respect to the seat base 14 in which the mount 12 can support the seat base 14. In some embodiments, the mount 12 is located in a central position beneath the seat base. However, in other embodiments (such as in the illustrated embodiment), the mount 12 is offset from the center of the seat base 14.

The seat base 14 can be coupled to the mount 12 by at least one pivot 26. As shown in FIGS. 1-6 for example, the illustrated embodiment utilizes two pivots 26 to allow the seat base 14 to move between the horizontal deployed position as shown in FIGS. 1-3 and 6 to the substantially vertical stowed position as shown FIG. 5. The pivots 26 can extend between the seat base 14 and the mount 12. For example, one pivot 26 of the illustrated embodiment extends from a front support 28 of the seat base 14, while another pivot 26 extends from a rear support 30 of the seat base 14.

The pivots 26 can be fixed with respect to either the mount 12 or the seat base 14. In some embodiments, the pivots 26 are pivotable with respect to the mount 12 and the seat base 14. In the illustrated embodiment, the pivots 26 are fixed to the seat base 14, and are pivotable within apertures 32 in the mount 12 (although an opposite construction can instead be used). The aperture 32 can have any shape desired, and in some embodiments are elongated to permit the seat base 14 to translate or to simultaneously translate and pivot while moving between stowed and deployed positions.

Figure 1:
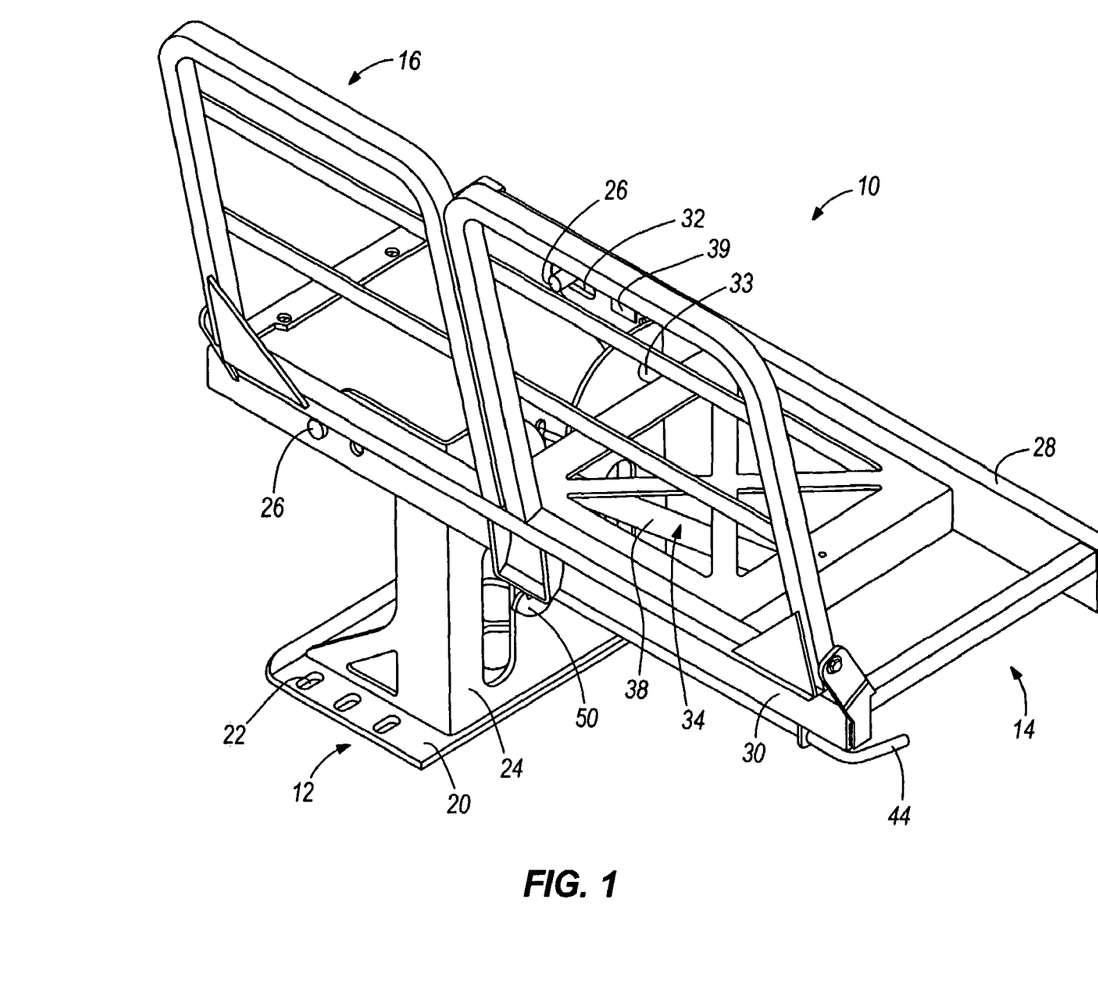
FIG. 1 is a rear perspective view of a stowable vehicular seat according to an embodiment of the present invention, shown with the seat base in a deployed position and the seat back in an unfolded position.
Figure 2:
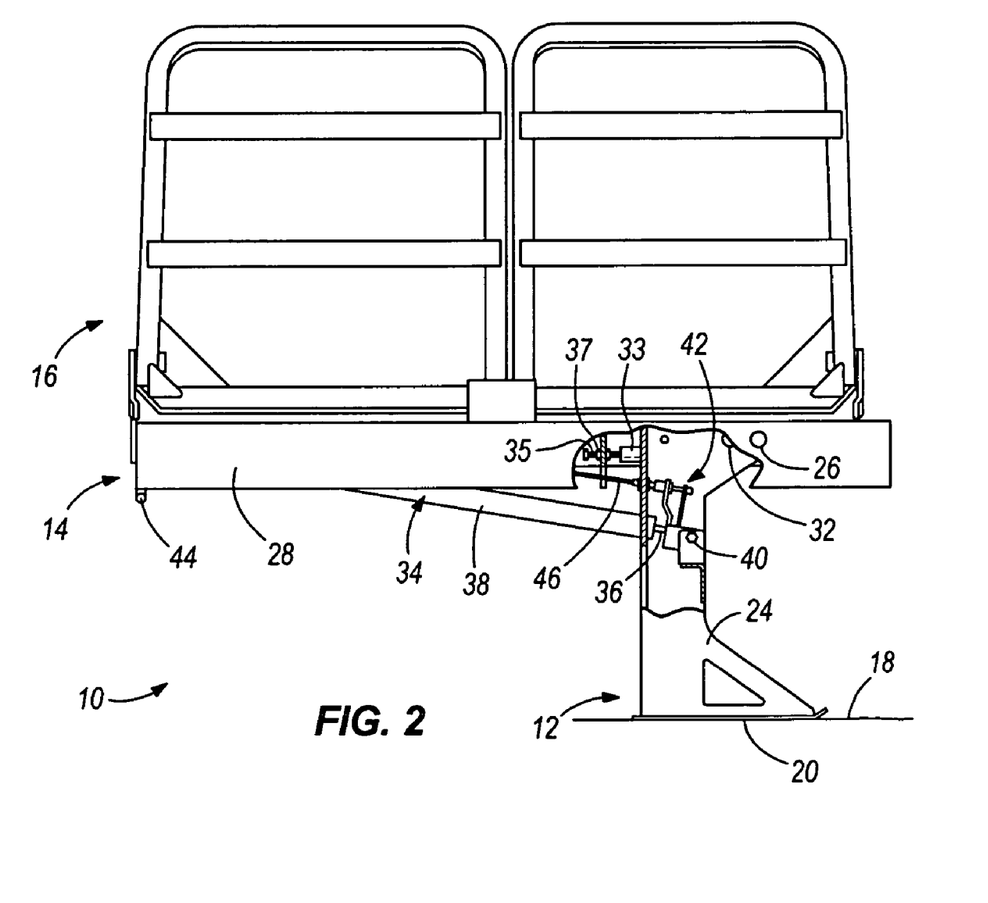
FIG. 2 is a front elevational view of the stowable vehicular seat illustrated in FIG. 1, shown with the seat base in a deployed position and the seat back in an unfolded position.
Figure 3:
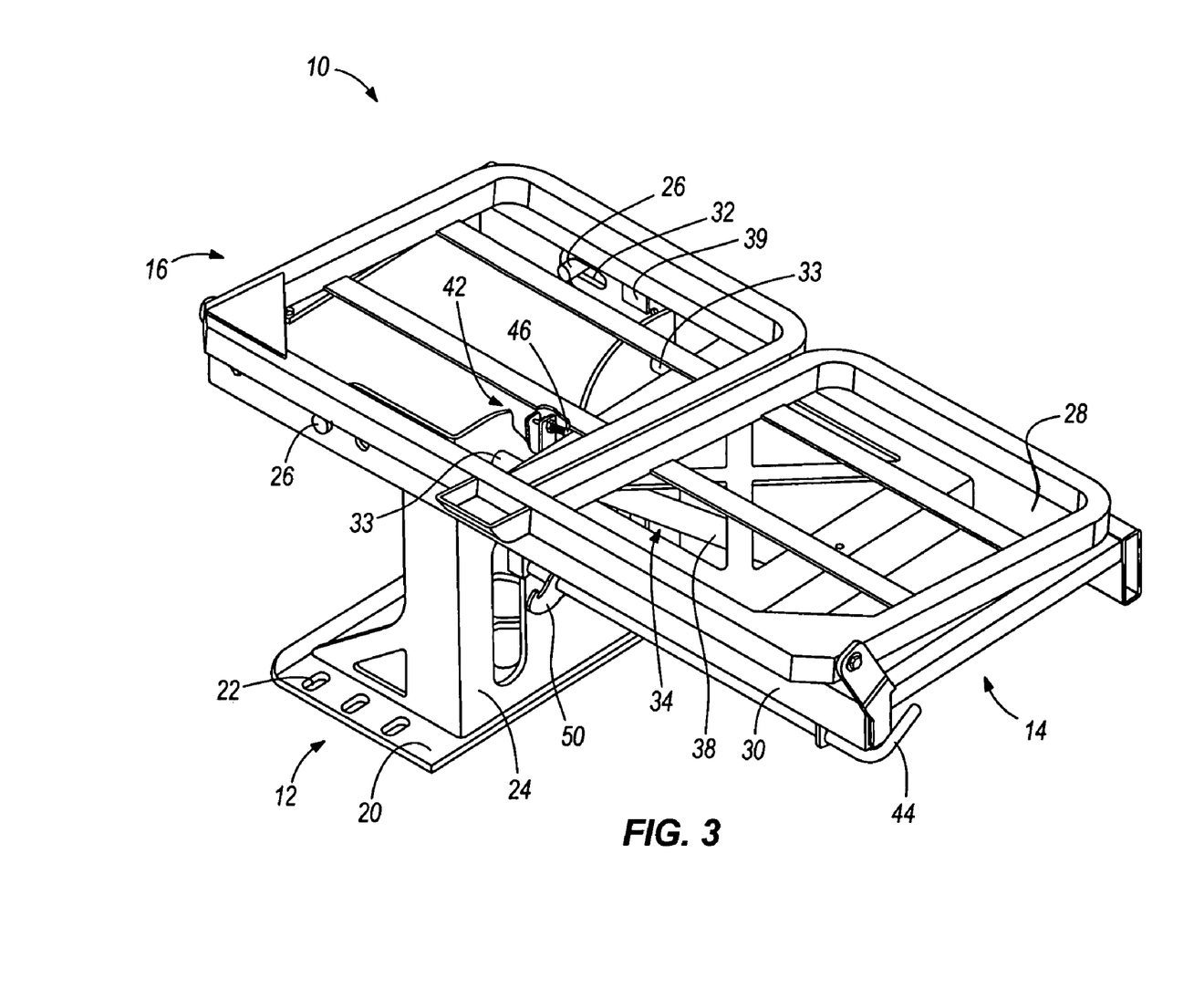
FIG. 3 is a rear perspective view of the stowable vehicular seat illustrated in FIGS. 1 and 2, shown with the seat base in a deployed position and the seat back in a folded position.
Figure 4:
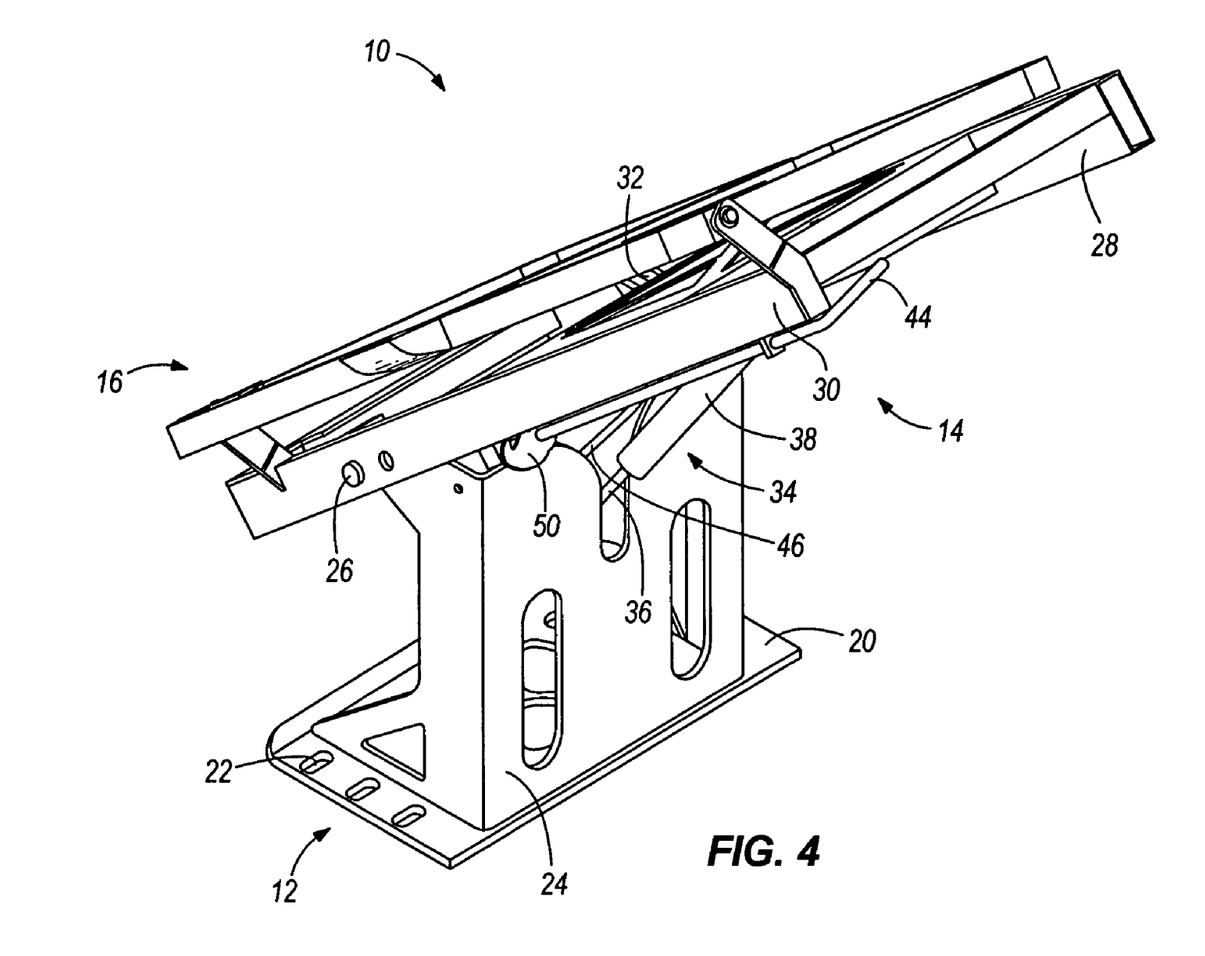
FIG. 4 is a rear perspective view of the stowable vehicular seat illustrated in FIGS. 1-3, shown with the seat base in a partially rotated position and the seat back in a folded position.

In some embodiments of the present invention, the seat is provided with one or more stops that limit the range of motion of the seat base 14 with respect to the mount 12. By way of example only, the illustrated seat 10 has two stops 33 that support the seat base 14 in a horizontal, deployed position. In other embodiments, a single stop 33 or more than two stops 33 can be used. The stops 33 illustrated in the figures are attached to the seat base 14, and are positioned to abut the mount 12 when the seat base 14 is pivoted sufficiently toward the deployed position. Alternatively, the stops 33 can be attached to the mount 12 to be abutted by the seat base 14 when pivoted sufficiently toward the deployed position. As best shown in FIGS. 1-3, the stops 33 are located between the seat base 14 and the mount 12 when the seat base 14 is pivoted to its deployed position.

The stops 33 can take any shape and form desired, such as posts, blocks, and the like. Also, the stops 33 can be made of any material, such as metal, plastic or other synthetic material, composites, and the like. In some cases, the stops 33 include or are made of resiliently deformable material in order to cushion impact of the stops 33 when the seat base 14 is lowered to a deployed position and/or to absorb vibration of the seat 10 between the seat base 14 and the mount 12.

In some embodiments, the stop(s) 33 are adjustable in order to set and/or adjust the deployed position of the seat base 14 with respect to the mount 12. For example, the stops 33 in the illustrated embodiments include resiliently deformable heads upon threaded rods 35 received within apertures in the seat base 14. The threaded rods 35 have one or more nuts 37 that can be threaded to different locations upon the rods 35 in order to adjust the length of the stops 33 (and to thereby change the deployed position of the seat base 14).

In other embodiments, other types of adjustable and non-adjustable stops can be used to limit the range of movement of the seat base 14. By way of example only, one or more stops can be located on the pivots 26 such that the pivots 26 prevent rotation of the seat base 14 past a desired position. As another example, a portion of the seat base 14 can rest upon or otherwise engage a portion of the mount 12 at a rotational position of the seat base 14. In the illustrated embodiment for example, a flange 39 (see FIGS. 1, 3, 5, and 6) extends from the seat base 14 and is moved into contact with a top edge of the mount 12 when the seat base 14 is pivoted to a deployed position. Any other element or structure limiting the pivotal range of one element with respect to another can be employed and falls within the spirit and scope of the present invention.

The stops 33 described above with reference to the illustrated embodiment limit the range of movement of the seat base 14 to a deployed position. However, it will be appreciated that one or more stops 33 can also or instead be used to limit movement of the seat base 14 in an opposite direction (e.g., toward a stowed position).

Some embodiments of the present invention provide a seat 10 having a variable length strut 34 coupled between the mount 12 and to the seat base 14 or seat back 16. In some embodiments, more than one variable length strut 34 can be used, any (or all) of which can have the characteristics described below. The variable length strut 34 can be used to lock the seat base 14 in one or more positions with respect to the mount 12 in any manner described below. For example, the variable length strut 34 illustrated in the figures can lock the seat base 14 in a substantially horizontal deployed position, a substantially vertical stowed position, and in any position therebetween. In other embodiments, the variable length strut 34 can be locked in fewer positions, such as only in a horizontal deployed position and/or a vertical stowed position, in either of these positions and in one or more intermediate positions (or ranges of intermediate positions) and the like.

As described above, in some embodiments the variable length strut 34 extends between and is coupled to the mount 12 and the seat base 14. The variable length strut 34 can have at least two portions 36 and 38 that are selectively moveable with respect to each other. In the illustrated embodiment, one portion 36 is coupled to the mount 12, while the other portion 38 is coupled to the seat base 14. In some cases, either or both portions 36, 38 are rotatably coupled to the mount 12 and seat base 14, respectively The two portions 36, 38 are engageable with each other (e.g., in telescoping relationship with one another) to position the seat 10 in different positions. The portions 36 and 38 can move with respect to each other to allow the seat base 14 to move with respect to the mount 12. Furthermore, in some embodiments the portions 36, 38 can be selectively secured in place with respect to one another (as described below) in order to prevent relative movement between the two strut portions 36, 38, as well as to prevent relative movement between the seat base 14 and the mount 12.

In some embodiments, the variable length strut 34 is an air spring or gas charged cylinder as illustrated in FIGS. 1-6. In such cases, the strut portions 36, 38 are the piston and piston housing. Depending at least in part upon the type of variable length strut 34 used, the variable length strut 34 can be used to help lift the seat base 14 toward a stowed position and/or to help lower the seat base 14 in a controlled manner. For example, an air spring or gas charged cylinder 34 can be used to exert an extending force, thereby reducing the amount of force needed to lift the seat base 14 toward its stowed position. As another example, such an air spring or gas charged cylinder 34 can be used to resist a compression force, thereby slowing the rate at which the seat base 14 is pivoted to its deployed position.

In alternative embodiments, other types of variable length struts 34 can be used to provide force helping to lift the seat base 14 and/or to control the rate at which the seat base 14 drops to a deployed position. For example, one or more hydraulic cylinders can be used to provide such forces. Also, a threaded rod engaged with a threaded housing (such as a screw jack construction) can be used with a mechanical or electromechanical actuator to provide such forces. Still other types of variable length struts 34 providing these forces are possible and fall within the spirit and scope of the present invention.

In some embodiments of the present invention, the seat 10 further comprises a lock 42 (see FIGS. 2, 3, and 6) coupled to the variable length strut 34. The lock 42 can be used to control the ability to lengthen and/or shorten the variable length strut 34. The type of lock 42 used depends at least in part upon the type of variable length strut 34 used. For example, the gas cylinder variable length strut 34 used in the illustrated embodiment can be secured at two or more different lengths of the first and second strut portions 36, 38 (defined by the different positions of the first and second strut portions 36, 38 with respect to one another), and can be released to extend or contract to different lengths by actuating a lever on of the strut 34. Actuation of the lever can permit gases to escape the variable length strut 34, enter the variable length strut 34, or move from one internal chamber of the variable length strut 34 to another. As is well known to those skilled in the art of gas cylinders, other types of actuators can instead be used to permit the strut 34 to be shortened or lengthened.

In any of the variable length strut embodiments described above (regardless of whether capable of exerting extension forces or forces resisting compression), a number of different locks can be used to releasably secure the variable length strut 34 at one or more particular lengths. For example, in some cases the strut portions 36, 38 can be a rod, tube, or other elongated element slidable within a tube or other element. These two strut portions 36, 38 can selectively engage each other in a manner to prevent relative movement of the strut portions 36, 38 with respect to one another. For example, one strut portion 36, 38 can have a plurality of notches, spring-loaded pins or balls, or other elements releasably engagable with notches on the other strut portion 38, 36 to selectively prevent relative movement between the strut portions 36, 38. In such cases, any type of detent mechanism can be used to releasably secure the strut portions 36, 38 with respect to one another. Alternatively, one strut portion 36, 38 can be provided with a ratchet releasably engagable with teeth, apertures, protrusions, or other features or elements on another of the strut portions 38, 36 to releasably set a length of the variable length strut 34. Still other manners of releasably setting one axially moving member with respect to another axially moving member can be employed, and fall within the spirit and scope of the present invention.

With reference again to the illustrated embodiment, the lock 42 on the variable length strut 34 can be actuated in many ways to permit the variable length strut 34 to be shortened or lengthened. For example, the lever on the variable length gas cylinder strut 34 in the illustrated embodiment is attached to a Bowden cable 46, which extends to an actuator 44 accessible by a user. The sheath 48 (see FIGS. 6 and 7) of the Bowden cable 46 can be attached to the seat base in any suitable manner. Any type of actuator can be used to pull and/or push the Bowden cable 46 for actuating the strut lever, such as a knob or pivotable lever to which the cable 46 is attached. In the illustrated embodiment for example, a lever is attached to the seat base 14 or to the seat back 16, and can be rotated by a user to pull the Bowden cable 46 and to actuate the lever on the variable length gas cylinder strut 34. The user-manipulatable lever can be attached at any user accessible location on the seat base 14 or seat back 16, and in the illustrated embodiment is attached to an end of the seat base 14.

In some embodiments, the seat 10 has a user actuatable control for retaining the seat back 16 in an unfolded position. This control can also be actuated by a user to release the seat back 16 to a folded position. Any conventional seat back retaining device can be employed for this purpose. However, in some embodiments this device is actuated by the same actuator used to unlock the variable length strut 34 described above. For example, by actuating the lever 44 in the illustrated embodiment, the seatback 16 can also be released to move from an unfolded position to a folded position (described in greater detail above). As illustrated in FIGS. 1 and 3-6, a catch 50 is coupled to the lever 44 and can selectively engage a portion of the seat back 16 or an element coupled thereto. The lever 44 can be biased by a spring or other biasing element toward a position that causes the catch 50 to engage the seat back 16. For example, the lever 44 in the illustrated embodiment is biased by a torsion spring 54 (see FIG. 6). The torsion spring 54 has one end that engages the seat base 14 or seat back 16 and another end that engages the lever 44, thereby biasing the lever 44 to rotate in a first direction to cause engagement of the catch 50 with the seat back 16 and to cause the lock 42 to lock the variable length strut 34.

Rotation of the lever 44 in a second direction opposite the first direction causes the catch 50 to move to a position that releases the seat back 16 for pivotal movement about one or more pivots. Rotation of the lever 44 in the second direction also causes the cable 46 to move relative to the sheath 48, which causes the lock 42 to move. In alternative embodiments, the lever 44 need not be biased at all, or can be biased by a tension spring, a compression spring, an elastic member, or any other biasing element.

Although the lever 44 discussed above is illustrated as being a rod rotatable within one or more apertures, other forms of levers will work, any of which can be coupled to actuate a cable 46 as described above or to directly actuate the lock 42 on the variable length strut 34. For example, in some embodiments, the lever 44 can be pivotable about a fulcrum to actuate the catch 50 and/or the lock 42. In other embodiments, a rod, bar, or other element can be positioned to actuate the lock 42 directly. Additionally, the lever 44 can be replaced with a Bowden cable attached to the catch to actuate the catch 50. Also, the lever 44 can be powered, if desired. For example, a motor and/or solenoid can be connected to actuate the lock 42, either directly or by actuating a rod, lever, cable, or other element coupled to the lock 42. Furthermore, even though the embodiment described above utilizes a single lever 44 to actuate both the lock 42 and the catch 50, some embodiments can actuate each of these elements independently.

In operation, the stowable seat 10 can be maintained in a deployed position as illustrated in FIGS. 1 and 2. The seat base 14 can be supported by the stops 33 engaging the mount 12. The stops 33 can prevent further downward movement (below a substantially horizontal position) of the seat base 14 while deployed. In some embodiments, the locked variable length strut 34 also provides support to help maintain the seat base 14 in the deployed position. The locked variable length strut 34 can also prevent the seat base 14 from moving toward a stowed position.

In the illustrated embodiment, the lever 44 can be actuated to allow movement of the seat 10 from the deployed position to the stowed position. Actuation of the lever 44 causes the catch 50 to release the seat back 16. As such, the seat back 16 can be pivoted with respect to the seat base 14 as illustrated in FIG. 3. Actuation of the lever 44 also causes the lock 42 to release the variable length strut 34 for movement. As such, the seat base 14 can begin to pivot with respect to the mount 12 from the deployed position to the stowed position. As the seat base 14 moves from the deployed position to the stowed position, the strut portions 36 and 38 of the variable length strut 34 can move relative to each other, which causes the length of the variable length strut 34 to change. As described above, in some embodiments the variable length strut 34 can also assist the operator in raising the stowable seat 10.

With continued reference to the illustrated embodiment, once the lever 44 is released by the operator, the spring 54 biases the lever 44, the catch 50, and the lock 42 toward an at-rest position of each member. As such, the lock 42 of some embodiments can return to a locked state, securing the strut portions 36, 38 in place with respect to one another to lock the seat 10 in a desired position (e.g., a stowed or deployed position). When the lock 42 is locked, the stowable seat is prevented from moving from its stowed position toward the deployed position.

The lever 44 can also be actuated while the seat 10 is in the stowed position in order to return the seat 10 to the deployed position. Upon actuation of the lever 44, the lock 42 releases the variable length strut 34, which allows relative movement between the strut portions 36 and 38 of the variable length strut 34. The relative movement between the strut portions 36, 38 allows the seat 10 to move from the stowed position to the deployed position. Once the seat 10 reaches the deployed position, the stops 33 engage the mount 12 to hold the seat 10 in a substantially horizontal position. Furthermore, assuming that the lever 44 is released, the lock 42 can be locked again to prevent movement of the seat base 14 from the deployed position.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

As another example, the variable length strut 34 described above can extend between the seat base 14 and the mount 12 to perform one or more of the strut functions also described above. However, in other embodiments the variable length strut 34 can be attached to the mount 12 and to a location on the seat back 16. By exerting force upon the seat back 16, such forces are exerted on the seat base 14 coupled to the seat back 16.

Also, although the seat back 16 in the illustrated embodiment is movable between folded and unfolded positions, it should be noted that in some embodiments the seat back 16 is not movable between these positions, and is instead always secured in an unfolded position.

As yet another example, the seat base 14 in the present invention need not necessarily be pivotably coupled to a mount 12 to pivot the seat 10 about an axis extending in a forward and rearward direction. Instead, the principles of the present invention can be employed for any seat 10 in which the seat base 16 is coupled to a mount 12 and is pivotable about an axis extending in any direction (e.g., along a back of the seat base 14, at either side edge of the seat base 14, and the like).

What is claimed is:

1. A vehicular seat moveable between a deployed position and a stowed position, the seat comprising:

a mount adapted to be coupled to an interior surface of a vehicle such that the mount is stationary with respect to the interior surface;

a seat base coupled to the mount and moveable with respect to the mount, the mount extending substantially the distance between the interior surface of the vehicle and the seat base;

a variable length strut coupled to the mount, the variable length strut having a first strut portion coupled to the mount and having a second strut portion coupled to the first strut portion and the seat base, the first strut portion movable with respect to the second strut portion;

a lock having a locked state in which the first and second strut portions are not movable with respect to one another to substantially prevent movement of the seat base with respect to the mount, and an unlocked state in which the first and second strut portions are movable with respect to one another to allow movement of the seat base with respect to the mount;

a seat back moveable between an upright position relative to the seat base and a folded position relative to the seat base;

a latch selectively engaging the seat back to substantially prevent movement between the upright and folded positions; and a user-manipulatable control coupled to the lock and operable to change the state of the lock, and coupled to the latch and operable to disengage the latch from the seat back, thereby affording movement of the seat base with respect to the mount and movement of the seat back relative to the seat base, wherein the lock is coupled to the latch by a cable, the latch rotating in response to operation of the user-manipulatable control to disengage the seat back and afford movement of the seat back relative to the seat base, and wherein rotation of the latch for disengagement from the seat back pulls on the cable to unlock the lock.

2. The vehicular seat as claimed in claim 1, wherein the variable length strut is one of a pneumatic cylinder and a hydraulic cylinder.

3. The vehicular seat as claimed in claim 1, wherein the variable length strut is pivotably coupled to the mount and to the seat base.

4. A vehicular seat, comprising:
a seat base rotatable about a first axis between a deployed position in which the seat base is substantially horizontal and positioned to support a seated user, and a stowed position in which the seat base is rotated away from the deployed position;
a seat back rotatable about a second axis, wherein the second axis is non-parallel with respect to the first axis;
a strut coupled to the seat base and another portion of the seat, and variable to different lengths corresponding to different rotational positions of the seat base;
a lock coupled to the strut, the lock having a locked state in which the strut is secured against change in length in any of the different rotational positions of the seat base, thereby preventing rotation of the seat base, and an unlocked state in which the length of the strut can be changed for rotation of the seat base;
a user-manipulatable control, wherein the seat back has a first state in which the seat back is rotatable with respect to the seat base and a second state in which the seat back is secured against rotation with respect to the seat base, and wherein the user-manipulatable control is operable to release the seat back from the second state to the first state; and
a latch coupled to the user-manipulatable control and movable by the user-manipulatable control to selectively secure the seat back against rotation relative to the seat base,
wherein the user-manipulatable control is coupled to the strut by way of the latch, and wherein movement of the latch by the user-manipulatable control to afford rotation of the seat back relative to the seat base operates to unlock the lock.

5. The vehicular seat as claimed in claim 4, farther comprising a user-manipulatable control coupled to the strut and operable to change the state of the lock.

6. The vehicular seat as claimed in claim 5, wherein the user-manipulatable control is coupled to the strut by a cable.

7. The vehicular seat as claimed in claim 4, wherein the strut is one of a pneumatic cylinder and a hydraulic cylinder.

8. The vehicular seat as claimed in claim 4, wherein the strut is pivotably coupled to the seat base.

9. A method of changing the position of a vehicle seat with respect to a vehicle, the seat including a seat base and a seat back pivotable with respect to the seat base between a folded position and an upright position, the method comprising:
operating a user-manipulatable control;
unlatching a seat back latch in response to operation of the user-manipulatable control to allow movement of the seat back from the upright position toward the folded position;
unlocking a seat base lock in response to unlatching the seat back latch to allow movement of the seat base from a lowered position toward a raised position;
rotating the seat base about a first axis;
changing the length of a strut by rotating the seat base, wherein the strut is coupled to the seat base and secured against a change in length when the seat base lock is in a locked state;
rotating the seat back toward the folded position about a second axis, wherein the second axis is non-parallel with respect to the first axis.

10. The method as claimed in claim 9, wherein operating the user-manipulatable control includes rotating a shaft to unlatch the seat back latch, and wherein unlatching the seat back latch includes rotating the latch.

11. The method as claimed in claim 9, wherein rotating the seat base further comprises pivoting the strut with respect to the seat base.

12. The method as claimed in claim 10, wherein the seat base lock is coupled to the seat back latch by a cable, and wherein rotating the shaft to unlatch the seat back latch includes pulling on the cable to unlock the seat base lock.

* * * * *